Aug. 10, 1965  C. KOCH  3,199,776
EVALUATION DEVICE FOR A PHOTOELECTRIC EXPOSURE METER
Filed March 29, 1963  4 Sheets-Sheet 1

INVENTOR:
CARL KOCH
BY Werner W. Kleeman
His Attorney

INVENTOR:
CARL KOCH
BY Werner W. Kleeman
His Attorney

Aug. 10, 1965   C. KOCH   3,199,776
EVALUATION DEVICE FOR A PHOTOELECTRIC EXPOSURE METER
Filed March 29, 1963   4 Sheets-Sheet 3

INVENTOR:
CARL KOCH
BY Werner W. Kleeman
His Attorney

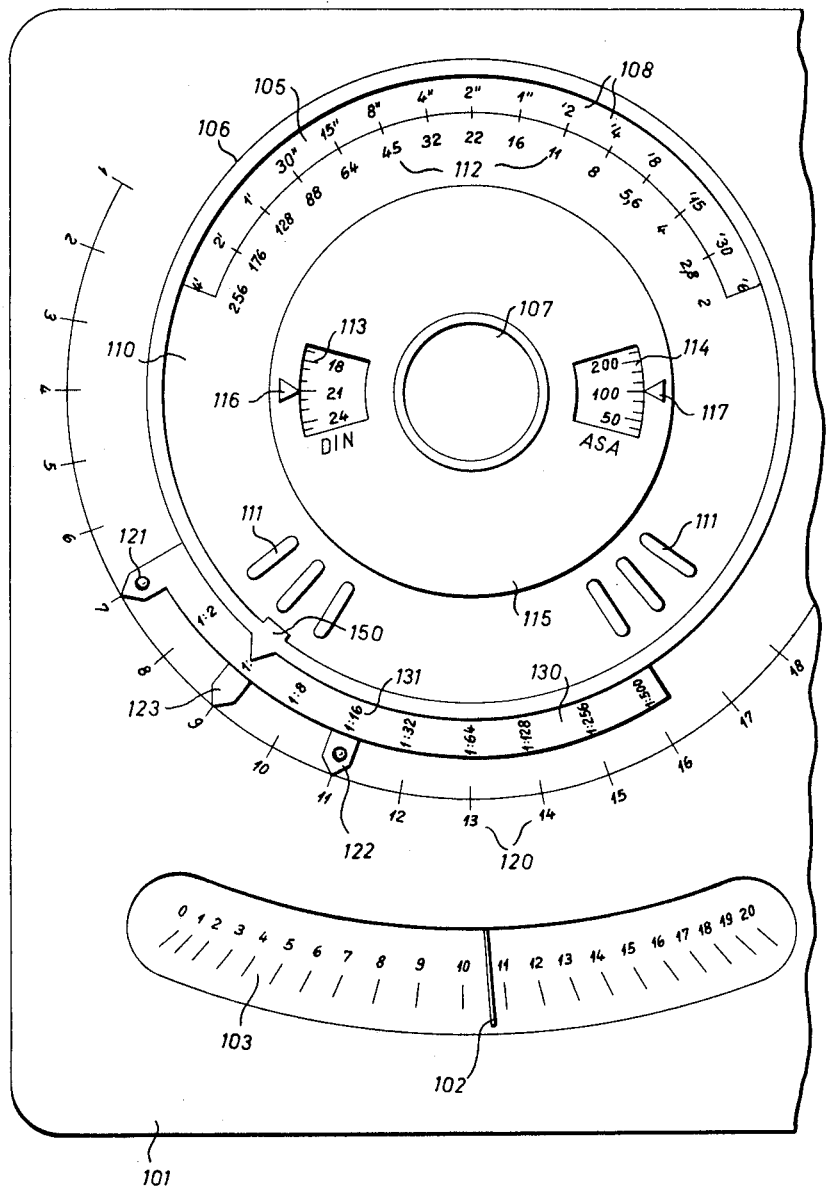

3,199,776
EVALUATION DEVICE FOR A PHOTOELECTRIC
EXPOSURE METER
Carl Koch, Vordersteig 2, Schaffhausen, Switzerland
Filed Mar. 29, 1963, Ser. No. 268,931
Claims priority, application Switzerland, Apr. 4, 1962,
4,090/62
3 Claims. (Cl. 235—64.7)

The present invention relates to an improved device for evaluating or analyzing the measurement results of a photoelectric exposure meter. One of the primary novel aspects of the invention is essentially manifested in the feature that, two adjustable or settable markers or pointers are individually adjustable with respect to a common brightness scale and serve to temporarily retain the measurement results of picture portions or regions of different brightness, and that the two settable pointers are operably coupled with an average-value indicator or pointer in such a manner that the latter always indicates the average value of the two measurement results.

The inventive device renders it possible during the exposure measurement to retain the difference in brightness or intensity of different picture portions or regions, to thereby determine the correct exposure, which particularly for color photography leads to the best results. In consideration of the requirement that the object to be photographed with the taking of color or black-and-white photographs should not exceed a specific range of brightness in order to yield good reproducible values, it is possible with the evaluation device of the present invention to associate one of the two settable pointers with a scale which can be read by reference to the other settable pointer, which then gives the resultant range of brightness or contrast from the two measurement results, for example as a proportionality factor or ratio value.

Furthermore, the reading or indication of the average-value pointer can be converted into the desired exposure data or information with the aid of a scale member of the type which is conventional with standard exposure meters, namely to indicate exposure time and diaphragm opening. In accordance with a preferred form of the inventive device, the average-value pointer is however associated with one of two carriers, of which the one carries an exposure-time scale and the other carries a reference pointer or diaphragm scale associated with the exposure-time scale. In this manner it is no longer necessary to perform a particular transfer of the average-value and adjustment of the conversion scale. The taking into consideration of the different sensitivity of the photographic materials can thereby take place in a number of different ways known to the art.

The professional photographer oftentimes must take photographs of one and the same object or subject with different photographic materials, for example with black-and-white and colored negative material and with colored slide or diapositive material. Since these materials possess varying sensitivity the exposure meter must be differently adjusted for each photograph, which has proven to be time-consuming, cumbersome, and subject to errors. It is thus advantageous to provide the inventive device, in addition to the reference pointer for the exposure-time scale, with at least one auxiliary reference pointer which is adjustable or settable with respect to the aforesaid reference pointer in accordance with the differences in sensitivity of different photographic materials. Advantageously, there is provided on both sides of the reference pointer two respective, separately adjustable, auxiliary pointers which are differently marked, so that the exposure meter can be quickly and easily accommodated for a number of different sensitive photographic materials.

As is known to the art with exposure times exceeding approximately ¼ to 1 second there occurs a reciprocity-law failure (Schwarzschild-Effekt) which becomes apparent with a decrease in sensitivity with increasing exposure time. In order to take into account this so-called reciprocity-law failure, in the best situations there is made available tables or correction curves, the use of which however is cumbersome. It has thus been proposed to provide the inventive device, in addition to the standard exposure-time scale, with at least one so-called "reciprocity-law failure" scale which for a given or specific photographic material permits of a direct reading with increasing exposure times of the actually required longer exposure time. The "reciprocity-law failure" scale can thus be arranged above the usual exposure-time scale or can be displaceable away from the latter, or in another suitable manner can be constructed to be mountable and demountable.

Accordingly, an important object of the present invention is to provide an improved evaluation device for an exposure meter wherein exposure information is depicted in a simple and easy to read manner for a wide variety of film speeds.

Another important object of the present invention is the provision of evaluation means for an exposure meter whereby the measurements of the brightness of different regions of an object to be photographed can be quickly ascertained and temporarily retained, including means for rapidly obtaining an average-value of the resultant measurements, whereby correct exposure information can be easily and reliably determined.

A further object of the present invention is to provide means for evaluating exposure information from at least two measurement results and providing a reading of the resultant range of brightness or contrast from such measurement results in the form of a proportionality factor for example.

Still a further important object of the subject invention is to provide improved evaluation means for an exposure meter including means for taking into account the variations in sensitivity of different photographic materials permitting of rapid evaluation of exposure information for such differently sensitive materials without requiring adjustment of the exposure meter for each of said different photographic materials.

Yet a further important object of the present invention is to provide an evaluation device for exposure meters including a "reciprocity-law failure" scale which for a specific photographic material permits of a direct reading during increasing exposure times of the actually required longer exposure time, to thereby take into account the known reciprocity-law failure without having to resort to tables or correction curves.

One further very important object of the present invention is the provision of evaluation means for an exposure meter including settable pointer means for quickly temporarily retaining measurement results of picture portions or areas of an object to be photographed possessing different degrees of brightness, as well as an average-value pointer interconnected with said settable pointer means in such a manner as to automatically indicate the average value of the measurement results temporarily retained by said settable pointer means.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings wherein like reference numerals generally indicate similar elements:

FIGURE 6 illustrates a further embodiment of an evaluation device for an exposure meter according to the invention, depicted in a manner similar to the embodiment of FIGURE 4.

Figure 1:
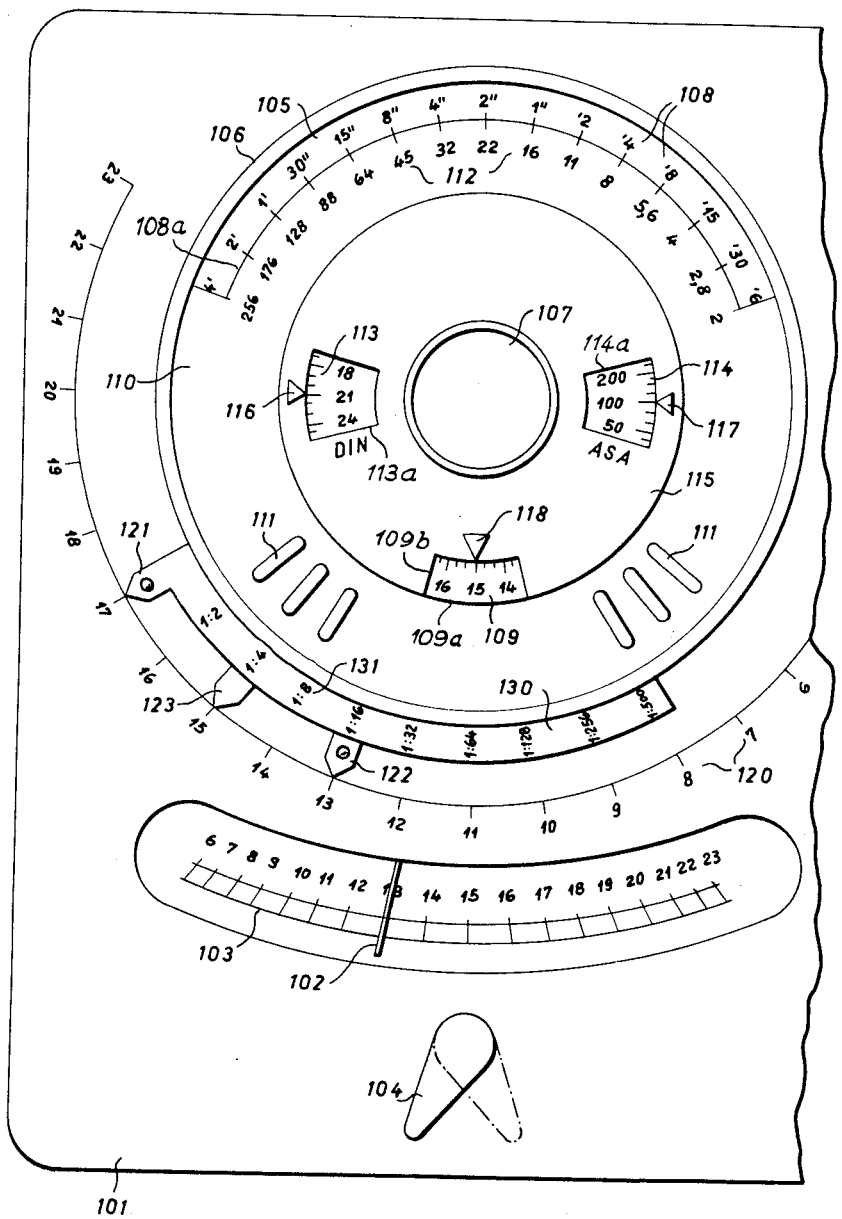
FIGURE 1 illustrates a portion of a photoelectric exposure meter provided with an evaluation device according to the present invention as viewed from the front or read-off side.

Referring now to the drawings and, more particularly to FIGURE 1, wherein only enough of an exposure meter has been illustrated to enable one to clearly understand the underlying principles of the present invention, it will be recognized that the illustrated photoelectric exposure meter is provided within its housing 101 with an electric indicator which may be of known construction and of the type provided with a pointer 102 and a read-off scale 103. Behind a non-illustrated opening of the housing 101 there is located a photoelectric cell (not shown) which is operably coupled with the electric indicator, in a manner well known to those skilled in the art. A hand-operated selector switch 104 renders it possible to set the exposure meter at two different sensitivities. The selector switch 104 is mechanically coupled with the read-off scale 103 in such a manner that upon switching the measuring range the scale 103 is also correspondingly changed in an automatic manner. The scale 103 is calibrated with desired units or indicia of brightness, whereby the division or graduation markings of said scale are labeled with sequentially arranged numbers 6 to 23. With double brightness the pointer 102 always moves to the division marking labeled with the next higher number.

Arranged at the external side or face of the housing 101 of the exposure meter is a device for evaluating the reading of the exposure meter. This evaluation device or means exhibits a circular disk 105 which carries a rim member 106 fixedly connected therewith and through the agency of which the circular disk 105 can be manually rotated about a stationary pin 107. At the peripheral portion or marginal edge of the circular disk 105 there is provided an exposure-time scale 108 and further radially inwardly there is carried a brightness scale 109. The latter scale 109 is provided with markings or numbers corresponding to the indicator or read-off scale 103 of the electric instrument. The circular disk 105 is for the most part covered by another disk 110 which possesses cut-outs or apertures 108a and 109a for rendering viewable the scales 108 and 109, respectively, situated therebeneath.

The second disk 110 which is concentric to the first disk is likewise rotatably mounted about the pin 107 and can be turned or rotated with the aid of gripping pins 111 only upon overcoming a frictional braking action. A diaphragm scale 112 is arranged on the disk 110 in such a manner that it is located directly opposite the exposure-time scale 108 and corresponds therewith. Additionally, two scales 113 and 114 are provided on the disk 110 which are calibrated in units of sensitivity or speed ratings for the photographic materials, of which scales 113 and 114 only a small area or portion is viewable via windows or apertures 113a and 114a, respectively, provided in a third disk 115. A further aperture 109b of the third disk 115 allows for viewing the brightness scale 109 of the first disk 105. The disk 115 is non-rotatably mounted about the pin 107 with respect to the housing 101 and exhibits three read-out indicators or pointers 116, 117 and 118 which are associated with the scales 113, 114 and 109, respectively.

The previously described construction of the exposure meter and the evaluation device is known to the art. The novelty essentially resides in the following: Fixedly secured to the housing 101 is a scale 120 which extends at a given desired distance externally of the disk 105 and is linearly divided. The graduations or division markings of this scale 120 are labeled with the same sequentially arranged numbers as those of the brightness scale 103 of the electric indicator instrument. Two adjustable or settable pointers 121 and 122 and an average-value pointer or indicator 123 are associated with the scale 120.

Figure 2:
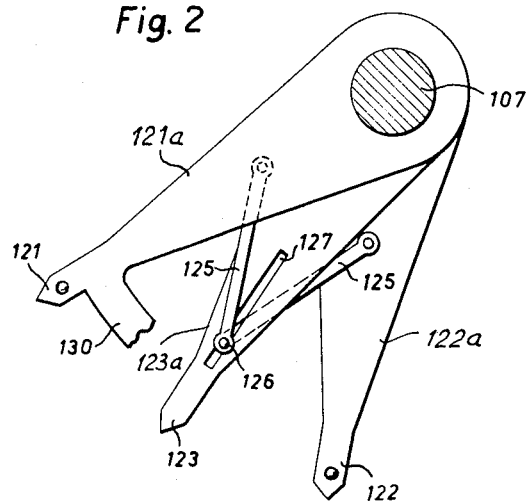
FIGURE 2 illustrates the manner in which the two separately adjustable or settable pointers of the exposure meter are mounted and the manner in which they are operatively coupled with the average-value pointer or indicator.

As best seen by referring to FIGURE 2, the settable pointers 121 and 122 and the average-value pointer 123 are formed by pivotably arranged lever arms 121a, 122a and 123a, respectively, rockable about the pin 107. The respective guide rods 125 are pivotably mounted to the respective lever arms 121a and 122a of the settable pointers 121 and 122. Both of the guide rods 125 are connected to one another and with the lever arm 123a forming the average-value pointer 123 through the agency of a hinge pin 126 which rides or slides in a radial slot 127 of the last-mentioned lever arm, namely lever arm 123a of the average-value pointer 123. In this manner the average-value pointer 123 is coupled with each of the settable pointers 121 and 122 such that it always assumes a position in the middle between said two settable pointers, as their position might be within specific limits. An arc-shaped scale band 130 is operatively connected or associated with the one settable pointer 121 and carries a scale 131 labeled with proportionality factors or ratio data which which can be read by referring to the other settable pointer 122 and provides a reading of the ascertained range of brightness or contrast.

The manner of use and mode of operation of the exposure meter and its evaluation device described with reference to FIGURES 1 and 2 is as follows: Initially the disk 110 is adjusted in accordance with the sensitivity or speed rating of the material to be used for the photographic picture taking, for example to 21 DIN or 100 ASA speed rating, respectively. Thereafter, the photoelectric cell of the exposure meter is directed at the brightest portion of the object to be photographed and there is read the deflection of the pointer 102 on the scale 103. There results, for example, a reading of the number "17." This indicated or read-out value is set or retained by means of the settable pointer 121, in that this pointer 121 is set to the number "17" on the scale 120. Afterwards, the photoelectric cell is directed at the darkest part of the object to be photographed and there is again read the deflection of the pointer 102, which now for example indicates the value "13." This read-out value is recorded or retained by means of the settable pointer 122, in that the latter is set to the number "13" on the scale 120. At the scale 131 it is possible to read-out the range of brightness or contrast of the object to be photographed in terms of a proportionality factor or ratio number. The average-value indicator or pointer 123 automatically comes to rest at the number "15" of the scale 120 upon setting of the pointers 121 and 122. This objectively obtained average-value of the two brightness measurements is employed for the further evaluation of the relevant exposure information, in that by rotating the rim 106 the same number "15" of the brightness scale 109 is set opposite the pointer 118. Finally, it is then possible to read the desired exposure time and the corresponding diaphragm setting from the two scales 108 and 112, respectively.

As a way of checking if one has properly used the device, it is possible to direct the photoelectric cell of the exposure meter at such a part or area of the object to be photographed which according to judgment or estimation exhibits a middle brightness, or will be very important for the taking of the photographic picture. There is thus obtained a subjective average-value. Consequently, if the pointer 102 is deflected to the number "15," which has also been indicated by the average-value indicator 123, then the photograph can be taken without further hesitation on the basis of this brightness data. If, however, there results a considerable deviation from the objective average-value, then it should be considered whether the objective or subjective average-value will give the better results, whereby the contemplated picture mood will considerably influence such decision. One can set a value opposite the pointer 118, for example in the middle between the objective and the subjective average-values.

Figure 3:
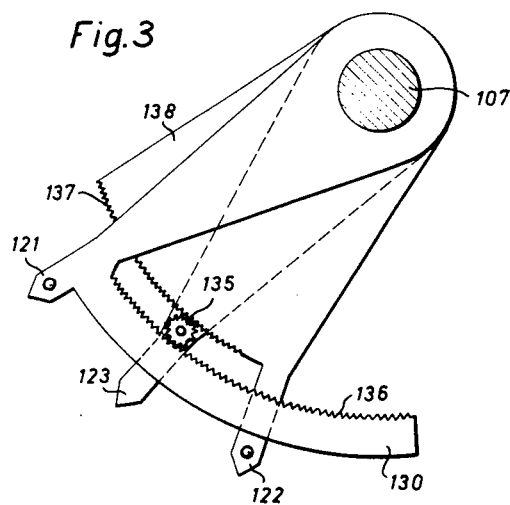
FIGURE 3 illustrates another construction and arrangement of the two settable pointers and average-value indicator for attaining the same results as the device depicted in FIGURE 2.

In FIGURE 3 there is depicted a variant construction of the mechanism for driving the average-value pointer 123. In this embodiment, the average-value pointer 123 carries a rotatably mounted pinion or gear 135 which, on the one hand, engages or meshes with an internal gearing or toothing 136 of the scale band 130 and, on the other hand, meshes with an external toothing or gearing 137 of a segment member 138. Since the scale band 130 is operably connected with the one settable pointer 121 and the segment 138 is connected with the other settable pointer 122, there results a coupling of the average-value pointer 123 with the two settable pointers 121 and 122 in such a manner that, the average-value pointer always assumes a mid-position between both of the settable pointers 121 and 122, as their position may tend to be within specific limits.

The embodiment of the inventive device illustrated in FIGURE 4, wherein like reference numerals generally denote similar elements, differs from that shown in FIGURE 1 in the following manner: At the disk 110 there is missing the diaphragm scale 112, because it is assumed that, the photoelectric cell of the exposure meter is always used behind the objective or lens of the photographic camera and, thus, the diaphragm adjusted or set at the objective is automatically taken into consideration. In lieu of the diaphragm scale 112 there is only provided a reference pointer 140 which is situated opposite the exposure-time scale 108. Moreover, in this embodiment there is missing the brightness scale 109 and its associated reference or read-out pointer 118. These means can be dispensed with because the disk 105 is rigidly coupled with the average-value pointer or indicator 123. The scale 120 associated with both settable pointers 121 and 122 as well as the average-value pointer 123 is labeled in the reverse direction in comparison with the embodiment of FIGURE 1, that is with a series of numbers running from left to right of FIGURE 4. In addition to the previously mentioned reference or read-out pointer 140 there is provided to the left and right thereof, in the manner illustrated, a pair of respective settable pointers or indicators 141, 142, 143 and 144, which if desired, can also be employed as read-out or reference pointers for the scale 108.

Figure 4:
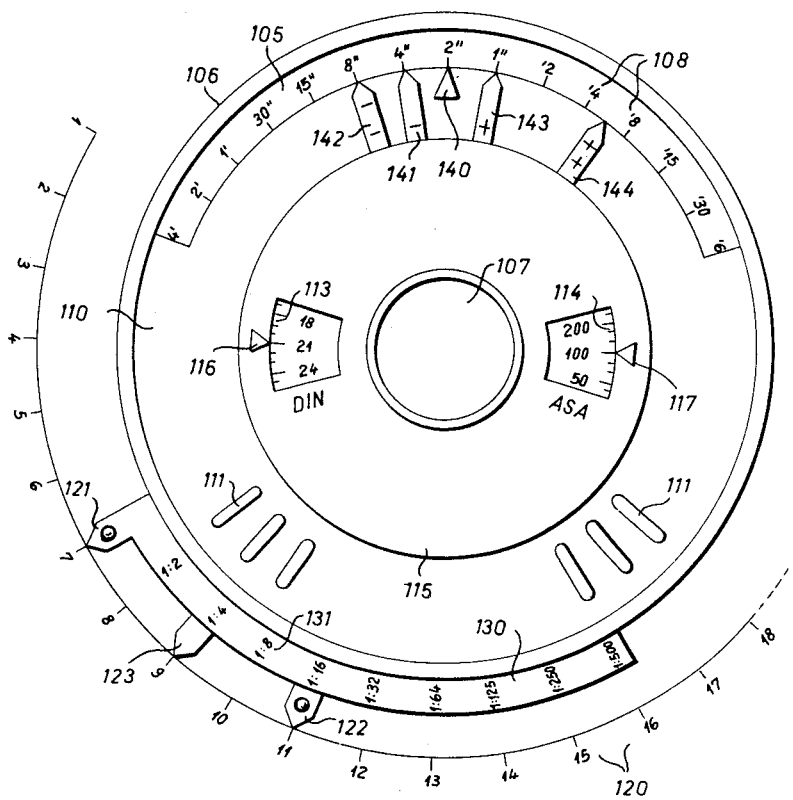
FIGURE 4 illustrates a portion of a second embodiment of an evaluation device or means for an exposure meter according to the present invention, depicted in a manner analogous to the device illustrated in FIGURE 1.

The mode of use and operation of the heretofore described evaluation device of FIGURE 4 is as follows: The one settable pointer 122 is set in accordance with the brightness measurement of the brightest picture portion or region, for example at the number "11." Afterwards the other settable pointer 121 is adjusted in accordance with the brightness measurement of the darkest picture portion or region, for example at the number "7." As a result, the average-value pointer 123 automatically assumes a mid-position between the pointers 121 and 122, so that it in the aforementioned example indicates the numeral "9." The exposure-time scale 108 is automatically rotated together with the average-value pointer 123 because it is arranged on the disk 105 rigidly connected with the average-value indicator 123. Now it is possible to read-off opposite the reference indicator or pointer 140 the correct exposure time which is valid for the average-value numeral "9," which is applicable when using a photographic material of the speed rating or sensitivity set at the fim speed rating scales 113 and 114 and for the lens aperture or diaphragm adjusted during the brightness measurement. At the scale 131 of the scale band 130 it is possible to again read opposite the pointer 122 the range of brightness of the object to be photographed.

The indicators or pointers 141 and 142 render it possible to read-off in a quick manner the exposure time for two less sensitive photographic materials. In the illustrated example, the pointer 141 is applicable for a photographic material having a speed rating of 50 ASA and the pointer 142 for a photographic material with a speed rating of 25 ASA. In an analogous manner the two other pointers 143 and 144 permit a reading-out of the exposure time for two higher sensitive photographic materials, for example with a speed rating of 200 ASA and approximately 1100 ASA, respectively.

The pointers 141 to 144 are set according to the momentarily employed photographic materials. They are of advantage in those numerous practical situations in which the photographer must take the same object a number of times in succession with different photographic materials, for example with black-and-white negative film, color negative film, and color slide film. Since these materials, as a general rule, possess different sensitivities it was heretofore necessary each time to change the setting of the scales 113 and 114 when a change from one to the other photographic material occurred. As should be readily apparent such manipulations are cumbersome, time-consuming, and can easily lead to errors. It is much simpler and safer to employ the pointers 141 to 144 as auxiliary reference pointers for the exposure-time scale 108. These pointers must only then be once adjusted or set corresponding to the differences in sensitivity of the photographic materials.

Figure 5:
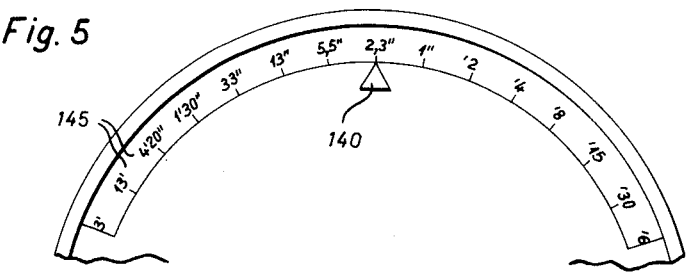
FIGURE 5 illustrates details of a "reciprocity-law failure" scale which can be employed in lieu of the exposure-time scale depicted in FIGURE 4.

With exposure times which last longer than approximately ¼ to 1 second the reciprocity-law failure, as is known, makes itself felt, which manifests itself in a decrease of the sensitivity. This appearance does not make itself immediately discernible with all photographic materials, and it has not been accounted for or taken into consideration with the heretofore used exposure meters and evaluation devices. The consulting of tables and correction or interpolation curves, insofar as such are even available, is time-consuming and cumbersome. Thus, in accordance with FIGURE 5, there is provided a special, so-called "reciprocity-law failure" scale 145 for the device of FIGURE 4 which is valid for a specific photographic color-slide material available on the market. The scale 145 can be mounted above or in place of the usual exposure-time scale 108, in a manner not illustrated in greater detail. A comparison of the scales 108 and 145 indicates that with the "reciprocity-law failure" scale 145, the exposure times which are larger than 1 second are partially considerably longer in comparison with the exposure times appearing at scale 108. It should thus be recognized that with the use of the "reciprocity-law failure" scale 145 the corresponding or relevent photographic material can be more exactly exposed.

The evaluation device of a photoelectric exposure meter illustrated in FIGURE 6 differs from the first described embodiment in that, at the rim 106 of the circular disc 105 there is fixedly arranged a further settable pointer 150 which is settable with reference to the brightness scale 120 or in coincidence with the average-value pointer 123. In this embodiment, the brightness scale 109 and the associated reference pointer 118 can be dispensed with and, thus, are not provided. The brightness scale 120 is labeled in the reverse direction with respect to the embodiment according to FIGURE 1, that is with a series of markings running from left to right of FIGURE 6.

The mode of use and operation of this device is as follows: With the aid of the film speed rating scales 113 and 114 as well as the associated reference pointers 116 and 117, respectively, the device is adjusted to the sensitivity or speed rating of the photographic material to be used by correspondingly turning the disk 110 through the agency of the gripping means 111. Thereafter, the photoelectric cell of the exposure meter is directed toward the darkest picture portion or region of the object or subject to be photographed. The pointer 102 of the indicator instrument then deflects a given amount, for example to the number "7." This read-out or indicated value is retained or set by means of the settable pointer 121, in that the latter is set to the corresponding number "7" of the brightness scale 120. Afterwards, in an analogous manner there is measured the brightness of the brightest portion or region of the object or subject to be photographed, whereby the pointer 102 for example deflects to the number "11." This read-out or indicated value is retained by means of the settable pointer 122, in that such is set at the corresponding number "11" of the brightness scale 120. The average-value pointer 123 then, as already previously explained, automatically assumes a mid-position at the marking or number "9," which corresponds to the objectively determined average brightness of the object to be photographed. Then, the circular disk 105 is rotated by means of its rim 106 in such a manner that the settable pointer 150 comes to rest radially and in alignment with respect to the average-value pointer 123. At the two scales 108 and 112 it is now finally possible to read-out the required exposure time for the desired diaphragm or light stop. Whereas in the embodiment according to FIGURE 4 there was present a rigid connection between the average-value indicator 123 and the circular disk 105, in the embodiment according to FIGURE 6 there is only provided a visual coupling.

If in place of the described objective measurement of the average brightness of the object to be photographed there is undertaken only a subjective measurement, in that the photoelectric cell of the exposure meter is directed towards a portion or area of the object which is estimated to possess average brightness, then the pointer 102 deflects to one of the numbers "8," "9" or "10" or an intermediate position between these numbers. If it is desired to photograph on the basis of this measurement then one simply sets the settable pointer 150, by suitable rotation of the rim 106, to that position opposite the brightness scale 120 which corresponds to the indicated value of the pointer 102. Thereupon, the diaphragm opening and the exposure time for the photographing process can be easily read-off the scales 112 and 108, respectively.

It should be readily apparent and understood that the construction of the evaluation device can be varied in a number of different ways, namely, as concerns the considerations of the various sensitivities of the photographic materials. Thus, it is possible in further non-illustrated embodiments for example, to rotatably arrange the brightness scale 120 on the housing 101 as a function of the sensitivity of the photographic materials. In a further variant of the embodiment of FIGURE 4, the circular disk 105 could be adjustable with the exposure-time scale 108 in respect of the average-value pointer 123 in accordance with the sensitivity of the photographic materials. In a variant construction of the embodiment of FIGURE 6, the settable pointer 150 could be adjustable or settable with respect to the circular disk 105 provided with the exposure-time scale 108 as a function of the sensitivity of the photographic materials. In all of these situations the disk 110 would then be stationarily arranged on the pin 107 and the scales 113 and 114 as well as the reference pointers 116 and 117 must then be arranged at another location.

If desired there could be provided in addition to the settable pointer 150 of the last-described embodiment, still one or more auxiliary settable pointers which can be adjusted with respect to the settable pointer 150 corresponding to the differences in sensitivity of different photographic materials. The use of such auxiliary settable pointers is analogous to that of the auxiliary reference pointers 141 to 144 of the embodiment of FIGURE 4.

Naturally, the various scales of the evaluation device do not in every instance have to extend in a circular arc-shape about a common center. It is possible to construct the scales to be linear and to mount them upon ledges or guides which are displaceable towards one another. Moreover, in view of the reciprocal nature of the exposure-time scale and the diaphragm scale, it will be apparent that the circular disk 105 could be provided with an exposure-time scale or a diaphragm scale. Furthermore, and as should be appreciated, it is of no importance to the invention which of the scales are arranged to be stationary and which are mounted to be movable, since only the relative movement between such scales is of importance and comes into consideration.

While there is shown and described present preferred embodiments of the invention it is to be distinctly understood that the invention is not limited thereto but may be otherwise variously embodied and practised within the scope of the following claims.

Having thus described the present invention, what is desired to be secured by United States Letters Patent is:

1. Evaluation device for a photoelectric exposure meter used to determine the appropriate exposure information for photographic materials of varying sensitivity, said device comprising a disc member having an exposure information scale thereon, a movable reference pointer member superposed upon said exposure information scale and being movable relatively thereto in accordance with appropriate exposure information for photographic material of a certain sensitivity, adjustable means operable to set up the maximum and minimum brightnesses of an object to be photographed, mean brightness determining means controlled by said adjustable means and connected to said disc member to move the same until said reference pointer indicates a specific first value on the scale thereof, and at least one auxiliary reference pointer cooperating with said exposure information scale independently of said reference pointer member to indicate a second value on said scale, said second value defining the correct exposure information for a photographic material having a sensitivity different than said certain sensitivity.

2. Evaluation device according to claim 1, wherein there is provided at both sides of said reference pointer at least two separately adjustable, differently marked, auxiliary reference pointers.

3. Evaluation device according to claim 1, said exposure information scale comprising a reciprocity-law failure scale, said reciprocity-law failure scale being provided with suitable indicia corresponding to a specific photographic material to permit a direct reading of the actually required longer exposure time with increasing exposure times in consequence of the so-called reciprocity-law failure.

References Cited by the Examiner

UNITED STATES PATENTS

| 1,203,384 | 10/16 | Moss | 235—64.7 |
| 3,047,221 | 7/62 | Alfaya et al. | 235—64.7 |
| 3,069,080 | 12/62 | Uchihara | 235—64.7 |

FOREIGN PATENTS 515,071  12/30  Germany.

LEO SMILOW, *Primary Examiner.*

LEYLAND M. MARTIN, *Examiner.*